US008600398B2

(12) United States Patent
Siomina et al.

(10) Patent No.: US 8,600,398 B2
(45) Date of Patent: Dec. 3, 2013

(54) METHOD, APPARATUS AND SYSTEM FOR DEFINING POSITIONING CONFIGURATION IN A WIRELESS NETWORK

(75) Inventors: Iana Siomina, Solna (SE); Ari Kangas, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 152 days.

(21) Appl. No.: 12/805,809

(22) Filed: Aug. 19, 2010

(65) Prior Publication Data

US 2011/0105144 A1 May 5, 2011

Related U.S. Application Data

(60) Provisional application No. 61/257,707, filed on Nov. 3, 2009.

(51) Int. Cl.
*H04W 24/00* (2009.01)
(52) U.S. Cl.
USPC ............... 455/456.1; 455/436; 455/456.5; 370/328; 370/338
(58) Field of Classification Search
USPC ............ 455/456.1, 436, 456.5; 370/254, 328, 370/330, 334, 337, 344, 336
See application file for complete search history.

(56) References Cited

U.S. PATENT DOCUMENTS

| 2007/0008108 | A1 | 1/2007 | Schurig et al. | |
|---|---|---|---|---|
| 2011/0039583 | A1* | 2/2011 | Frank et al. | 455/456.5 |

FOREIGN PATENT DOCUMENTS

| EP | 1 148 752 A1 | 10/2001 |
|---|---|---|

OTHER PUBLICATIONS

3GPP TSG-RAN WG4 meeting #52bis, R4-093908, "LS on assistance information for OTDOA positioning support for LTE", Japan, Oct. 2-16, 2009 (3 pages).
3GPP TS 36.211 V8.7.0, 3rd Generation Partnership Project; Technical Spcification Group Radio Access Network; Evolved Universal Terrestrial Radio Access (E-UTRA); Physical Channels and Modulation (Release 8), May 2009 (85 pages).
3GPP TSG RAN1 #57, R1-092628, "On serving cell muting for OTDOA measurements", Jun. 29-Jul. 3, 2009, Los Angeles, CA (7 pages).
3GPP TSG-RAN WG1 meeting #58, R1-093626, Change Request—36.211 CR 139 (Rel-9, B) "Introduction of LTE Positioning", Shenzhen, China, Aug. 24-28, 2009 (5 pages).
3GPP TSG RAN WG1 meeting #58-bis, R1-093793, "Muting for LTE Rel-9 OTDOA Positioning", Miyazaki, Japan, Oct. 12-16, 2009 (6 pages).
PCT/SE2009/050625, "A method and apparatus for enhancing signal measurements for positioning in LTE", May 29, 2009.
International Search Report and Written Opinion mailed Nov. 26, 2010 (11 pages total).
3GPP TSG RAN1 #58, R1-093406, Motorola, "Positioning Subframe Muting for OTDOA Measurements", Shenzhen, China, Aug. 24-28, 2009 (9 pages).

(Continued)

*Primary Examiner* — Chuong A Ngo
(74) *Attorney, Agent, or Firm* — Nixon & Vanderhye, P.C.

(57) ABSTRACT

GPS and A-GPS based positioning methods can be used to determine UE locations to enable location based services to be provided. However, if a UE does not have such receivers or the wireless network is not able to provide assistance, these methods will not be applicable. An alternative is to use OTDOA measurements using positioning reference signals transmitted by cells of the network. By optimizing the set of cells transmitting their positioning reference signals on different positioning occasions and properly configuring the muting patterns, interference can be minimized and the UE location can be readily determined.

49 Claims, 9 Drawing Sheets

(56) References Cited

OTHER PUBLICATIONS

3GPP TSG RAN WG1 meeting #58-bis, R1-094336, Pantech & Curitel, "Muting for LTE Rel-9 OTDOA Positioning", Miyazaki, Japan, Oct. 12-16, 2009 (9 pages).
3GPP TSG-RAN WG4 #AH2, R4-101503, Qualcomm Incorporated et al., "Way Forward on Autonomous Muting", Dublin, Ireland, Apr. 12-16, 2010 (1 page).
European Office Action dated May 29, 2013 in European Application No. 10759743.7 (3 pages).
Chinese Office Action dated Jul. 8, 2013 in Chinese Patent Application No. 201080050481.7 w/English translation (11 pages total).
Chinese Office Action dated Jul. 15, 2013 in Chinese Patent Application No. 201080050481.7 (4 pages total).

* cited by examiner

METHOD, APPARATUS AND SYSTEM FOR DEFINING POSITIONING CONFIGURATION IN A WIRELESS NETWORK

RELATED APPLICATION

This application claims the priority and benefit of U.S. provisional patent application 61/257,707 entitled "DEFINING POSITIONING CONFIGURATION IN LTE" filed Nov. 3, 2009, which is incorporated herein by reference in its entirety.

TECHNICAL FIELD

Technical field of present disclosure relates to method, apparatuses and systems relates for interference management in wireless communications networks and in particular to wireless network architectures that utilize signal measurements from multiple cells for positioning, location and location-based services.

BACKGROUND

The possibility of identifying user geographical location in a wireless network has enabled a large variety of commercial and non-commercial services. These services include navigation assistance, social networking, location-aware advertising, emergency calls, etc. Different services may have different positioning accuracy requirements imposed by the application. In addition, there may exist regulatory requirements on the positioning accuracy for basic emergency services, an example of which is the FCC E911 service in the US.

In many environments, the position can be accurately estimated by using positioning methods based on GPS (Global Positioning System). Today, some networks may also assist the wireless terminals such as UEs (user equipment) in order to improve the terminal's receiver sensitivity and GPS startup performance such as in A-GPS (Assisted-GPS positioning). GPS or A-GPS receivers, however, are not necessarily available in all wireless terminals. In addition, not all wireless networks necessarily have a possibility to provide or assist in GPS-based positioning. Furthermore, GPS-based positioning may often have unsatisfactory performance in urban and/or indoor environments.

Conventionally, positioning methods based on time difference of arrival measurements (TDOA) have been widely used, for example, in GSM, UMTS and CDMA2000. FIGS. 1a and 1b outline the principle of a downlink observed time difference of arrival (OTDOA) positioning method. Each hyperbola in FIG. 1a illustrates an area with the same level of the reference signal time difference (RSTD) for two base stations. The UE measures the timing differences of multiple base stations. At least three measurements from geographically dispersed base stations with a good geometry are needed to solve for two coordinates of the UE and the receiver clock bias. Thus, to solve for the position of the UE, a precise knowledge of the base station locations and timing are needed. With OTDOA, unlike when measuring the time of arrival (TOA), synchronization between base stations and UEs is not a requirement.

In LTE, to enable positioning and facilitate positioning measurements of a proper quality and for a sufficient number of distinct locations, new physical signals dedicated for positioning—the positioning reference signals (PRS) have been introduced and specific positioning subframes have been agreed upon in 3GPP.

The PRS are transmitted from one antenna port (R6) according to a pre-defined pattern. FIG. 2 illustrates a PRS pattern when one or two physical broadcast channel (PBCH) antennas are in use. In the figure, the squares marked R6 indicate the PRS resource elements (RE) within a block of 12 subcarriers over 14 OFDM symbols, which is a 1 ms subframe with normal cyclic prefix. A set of frequency shifts can be applied to the pre-defined PRS patterns to obtain a set of orthogonal patterns which can be used in neighbour cells to reduce interference on the PRS and thus improve positioning measurements. This allows for modeling an effective frequency reuse of six. The frequency shift, which can also be viewed as vertical shift $v_{shift}$, can be defined as a function of the Physical Cell ID (PCI) of the cell as follows [3GPP TS 36.211]:

$$v_{shift} = \mathrm{mod}(PCI, 6)$$

The PRS can also be transmitted with zero power, which is one form of muting. Note that the PRS power can be assumed to be constant over an entire positioning occasion [3GPP TS 36.213], including for muting. Thus, if the power is zero, then it is zero in all subframes of the same positioning occasion.

To improve the "hearability" of PRS, that is, to allow for detecting of the PRS from more sites and at a reasonable quality, the positioning subframes have been designed as low-interference subframes. In other words, no data transmissions are allowed in general in the positioning subframes. In synchronous networks as a result, the PRS of a cell are interfered only by the PRS from other cells with the same PRS pattern index, i.e., with the same $v_{shift}$, and not by data transmissions.

In asynchronous networks, the PRS can still be interfered by data transmissions when the positioning subframes of a cell collide with normal subframes of another cell. The effect can be minimized by partial alignment, i.e., by aligning the beginning of positioning subframes in multiple cells within ½ of a subframe with respect to some time base.

If the UE is unable to detect the PRS for a cell, it will try to detect Common Reference Signals (CRS) and perform RSTD measurements based on the CRS signals. Combining of measurements based on the PRS and the CRS signals in principle can be possible. However, a failure to detect the PRS and then searching for the other signals of the same cell increases the cell detection time and may also degrade positioning measurements. The CRS signals in general have worse hearability than the PRS due to a lower effective frequency reuse of the CRS signals. When two transmit antennas are used for the CRS signals which is typical, the CRS signals typically have an effective frequency reuse of three.

The PRS are transmitted in pre-defined positioning subframes grouped by several consecutive subframes of length $N_{PRS}$. These pre-defined consecutive $N_{PRS}$ are referred to as a positioning occasion [3GPP TS 36.133]. The positioning occasions occur periodically with a certain periodicity of N subframes, which is the time interval between two positioning occasions. This is illustrated in FIG. 3 in which the first subframes of two positioning occasions are N subframes apart. In LTE, the currently agreed periods for N are 160, 320, 640, and 1280 ms in LTE, and $N_{PRS}$ can be any one of 1, 2, 4, and 6. Note that $N_{PRS}$ can differ from cell to cell.

For the OTDOA positioning, the PRS from multiple distinct locations need to be measured. As such, the UE receiver may have to deal with PRS that are much weaker than those received from the serving cell. Also, without the approximate knowledge of when the measured signals are expected to arrive in time and what is the exact PRS pattern, the UE would need to perform signal search within a large window, which would impact the time and accuracy of the measurements as well as increase the UE's complexity.

As mentioned above, the PRS can be transmitted with zero power. This should then apply for all PRS resource elements within the same subframe over the entire PRS transmission bandwidth. Currently, the way in which the PRS are muted are not specified in 3GPP. Also, no signaling is available to notify the UE on whether the PRS transmissions from a cell are to be muted in a certain subframe or not. However, some solutions have been mentioned or discussed.

One solution that has been put forth is the random muting by cells in which each base station, e.g., eNodeB in LTE, decides either that the PRS transmission opportunities are seized or not and the muting decision is made with some probability. In this implementation, there is no coordination among eNodeB's and the probability is statically configured per eNodeB or per cell. An advantage of this solution is that the decisions are made locally, by each cell, and no signaling among the eNodeBs is necessary.

There are disadvantages to the random muting solution. Real networks are inhomogeneous, with different cell coverage areas and user densities, and possibly different types of base stations. All these imply that setting optimal muting probabilities is a tedious task. Also, the UE does not have information on whether a cell which it is supposed to measure is muted or not further complicating the RSTD measurements and increasing the UE complexity. The optimal configuration of such probabilities may also vary, for example, over each day, and over a week and by cell. These factors make static configurations impractical.

Another solution proposed is to design a limited set of muting patterns and mapping the muting pattern IDs to the PCIs. R1-093793, "Muting for LTE Rel-9 OTDOA Positioning", 3GPP TSG-RAN WG1 meeting #58bis, October 2009.; R1-092628, "On serving cell muting for OTDOA measurements", 3GPP TSG-RAN WG1 meeting #57, June 2009. An advantage of the limited muting patterns solution is that given a table of muting patterns and the PCI received in the assistance information, the UE can determine when the PRS are transmitted from the cell of interest without the muting information being explicitly signaled to the UE.

However, this also comes with several disadvantages. One is that the muting patterns need to be either hard coded in UEs, which implies the solution is not suitable for all UEs, or the muting patterns need to be received from the network which would require new signaling. Another disadvantage is that mapping the muting patterns to the PCIs will most likely not result in an optimal muting configuration in non-uniform real networks that may also have a multi-layer structure, i.e. the muting configuration is fixed and thus is impossible to re-optimize unless PCI planning is redesigned for the entire network specifically for positioning which, from the operator's point of view, is most likely to be one of the least desired activity.

The existing solutions have at least the following problems:
1. Poor hearability of the PRS in some scenarios;
2. Permanently defined mapping between PRS transmission pattern and PCIs;
3. No specified way of interference coordination for PRS;
4. Inflexible positioning configuration according to the agreed assistance information; and
5. The positioning solution so far specified in 3GPP does not take into account distributed antenna systems and LTE Advanced (LTE-A) deployment scenarios.

Each of the identified problems of the existing solutions are discussed in further detail below.

Problem 1: The PRS patterns agreed upon in 3GPP have been designed to model six-reuse in frequency, i.e. the interference comes from every sixth cell in average in a uniformly planned network. However, this may not be sufficient in hierarchical and/or dense network deployments or even in typical real networks where cell shapes are irregular and cell sizes are non-uniform.

Problem 2: As described above, the PRS pattern has been agreed to be a permanently defined function of the PCI. A result is that for the same set of transmitting cells, the interferers are also set and the average level of interference for a stationary UE does not change. This means that the same UE may always experience the same bad interference conditions. Furthermore, the cell ID planning are very likely to be done with respect to reuse factor lower than six due to many considerations other than positioning. The PRS patterns are designed to enable effective six-reuse, while the CRS transmit patterns have effective reuse of three when being transmitted from two antennas which is expected to be a typical scenario.

Problem 3: A possibility of autonomous muting has been agreed upon in 3GPP RAN1. However, it has not been discussed much further and no solution has been agreed. The result is that no signaling is available to inform the UE that the PRS transmissions are muted in a certain cell in certain subframes. This is likely to have a negative impact on the positioning performance.

Problem 4: The agreed upon positioning configuration does define the PRS periodicity and offset of positioning subframes for a given cell. In the existing solutions, it is assumed that all measured cells have the same positioning configuration index $I_{PRS}$ as the serving cell. Without PRS muting, this results in that in synchronous networks, the PRS transmissions always collide in the same cells due to Problem 2.

Problem 5: Deploying distributed antenna systems is an attractive solution to enhance data communication which allows for higher bitrates and lower packet delays. However, from the positioning perspective, there is no gain in simultaneous transmissions of the PRS from distinct locations but using antennas associated with the same PCI. This results in that the UE cannot distinguish whether the signals are transmitted from different locations or have just arrived via multipath being transmitted from the same location. Furthermore, the UE position will then be calculated assuming that the transmitter location is the one associated with PCI, which will result in a greater positioning inaccuracy.

A similar problem occurs with relays type II that are able to decode and retransmit, but cannot be viewed by UEs as separate cells. The UEs could in principle receive the PRS also from such devices, but would require capabilities to figure out that the signals are transmitted by the devices and not base stations, which would further increase the UE complexity.

In dense networks, the PRS are assumed to be hearable from more distant base stations than, for example, the CRS signals. Additionally, with only 504 unique PCIs, it may occur that the PRS from more than one cell with the same PCI can be received in some area. This may occur even more often than with the CRSs, which is expected to be a problem in some scenarios. As an example, in a network with densely deployed base stations to ensure sufficient capacity, the problem is more crucial for PRS than for CRS because CRS may be simply not detectable at that large range where PRS is expected to be detected since PRS have better hearability. Thus the probability of hearing two cells with the same PCI is higher for PRS.

In some wireless networks, beaconing devices or some type of simple devices transmitting PRS may be deployed, which may lead to higher interference on PRS, although such devices may transmit a limited set of signals, e.g. PRS only, and thus do not introduce much interference in general. However, the interference from beaconing devices may be reduced by means of a proper coordination and configuration of transmit signal occasions. The UEs may also need to be able to at least distinguish between the devices and base stations when the devices are reusing the PCIs of the base stations. Furthermore, since such devices in general do not transmit data, the low-interference subframe concept is not really relevant for these types of devices.

SUMMARY

A non-limiting aspect of the disclosed subject matter is directed to a method for defining positioning configuration in the wireless network in which some or all cells of the network are capable of wirelessly transmitting positioning reference signals (PRS) during positioning occasions. The PRS are usable to determine a location of a user equipment via observed time difference of arrival (OTDOA) method. In a cell, each positioning occasion is composed of a predetermined number $N_{PRS}$ of consecutive subframes with a predetermined periodicity of N subframes, $N > N_{PRS}$, such that positioning occasions repeat every N subframes, N and $N_{PRS}$ both being integers greater than zero. In the method, the muting patterns of one or more cells of the wireless network are determined by a first network node. The muting pattern of a cell indicates a plurality of positioning occasions in which the cell will transmit its PRS and a plurality of positioning occasions in which the cell will mute its transmission of the PRS, in which a number of muted positioning occasions is greater than zero. In the method, assistance information is provided from a second network node to a user equipment being served by a serving cell. The assistance information includes the muting pattern of at least one cell determined by the first network node.

A non-limiting aspect of the disclosed subject matter is directed to a network node for defining positioning configuration in a wireless network in which some or all cells of the network are capable of wirelessly transmitting positioning reference signals (PRS) during positioning occasions. The network node includes a muting pattern determining unit arranged to determine muting patterns of one or more cells of the wireless network. The network node also includes a communication unit arranged to communicate the muting pattern of at least one cell to another network node and/or to a UE.

A non-limiting aspect of the disclosed subject matter is directed to a method of determining a location of a user equipment based on positioning reference signals (PRS) wirelessly transmitted from cells of a wireless network. The user equipment determines, based on the muting patterns of the plurality of cells, observed timed difference of arrival (OTDOA) of the PRS transmissions from the plurality of network nodes. The muting patterns of the plurality of cells are provided to the user equipment by the network.

A non-limiting aspect of the disclosed subject matter is directed to a user equipment arranged to its location based on positioning reference signals (PRS) wirelessly transmitted from cells of a wireless network. The user equipment includes a communication unit arranged to receive the PRS transmitted from a plurality of network nodes corresponding to a plurality of cells. The user equipment also includes an OTDOA determining unit arranged to determine OTDOA of the PRS transmissions from the plurality of network nodes based on muting patterns of the plurality of cells, the muting patterns of the plurality of cells having been provided to the UE by the network.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1A:
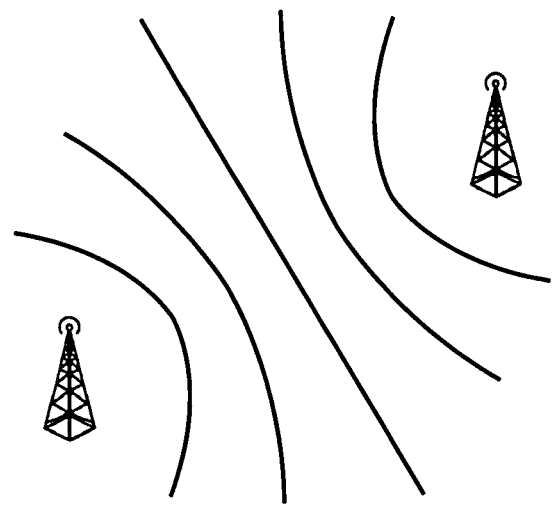
FIGS. 1A and 1B outline a principle of the downlink OTDOA positioning method.
Figure 1B:
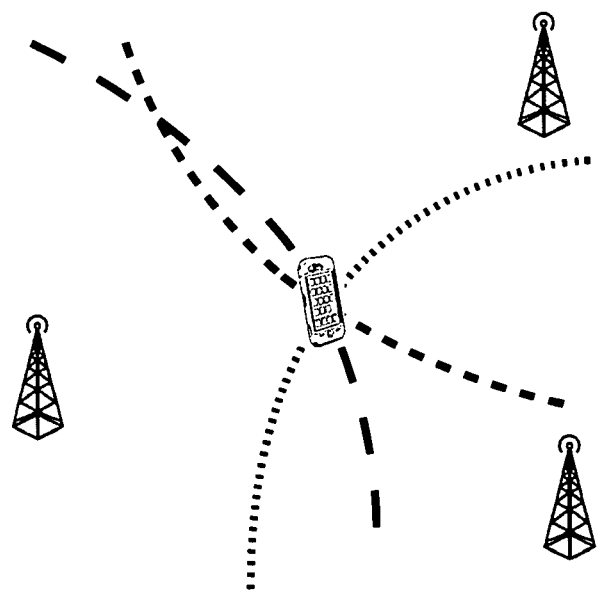
Figure 2:
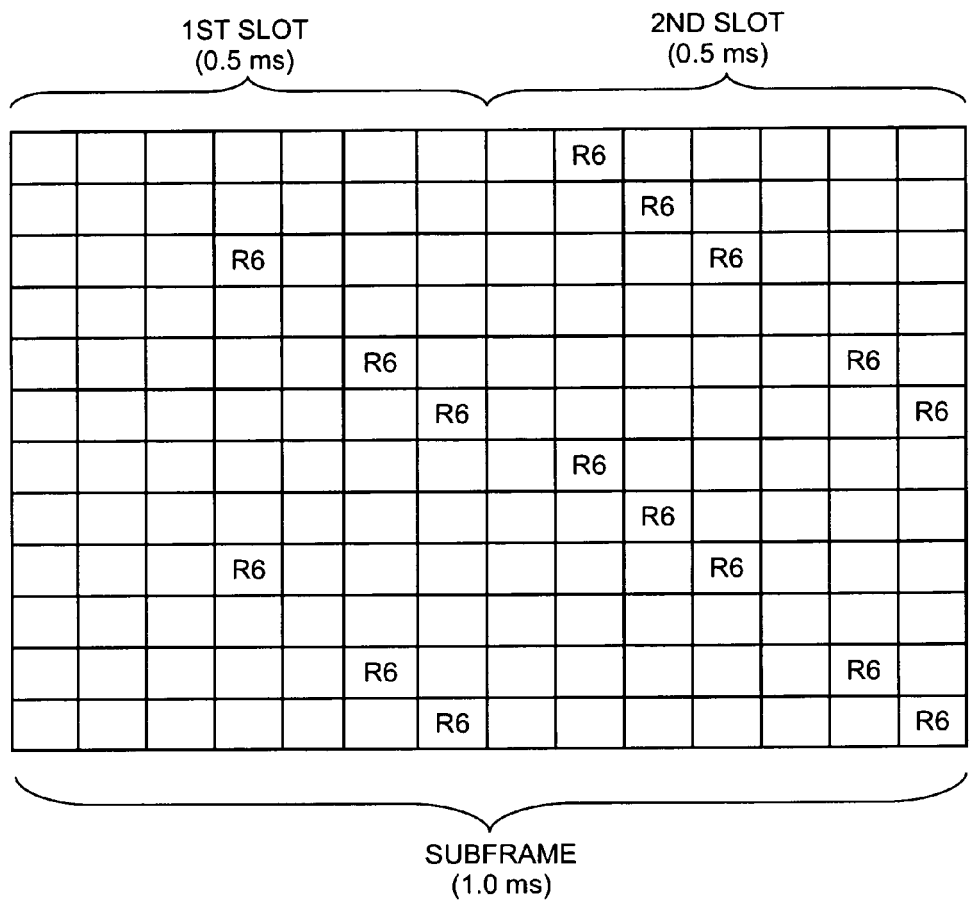
FIG. 2 illustrates a standardized PRS pattern when one or two antennas are used for PBCH and normal cyclic prefix is assumed.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, terms "cell" or "base station" may be used interchangeably depending on the context. One should keep in mind that a "cell" is not equivalent to a "base station". Cell refers to a radio coverage area and base station refers to a radio communication equipment that provides radio coverage to the corresponding cell.

Example radio communication equipments include eNodeBs in 3GPP, access points in WiFi (also referred to as "WLAN"), and base stations in WiMAX. A single equipment can support or serve multiple cells, typically by operating multiple antennas independently such as one antenna per cell or a set of coordinated antennas for each cell. The cells may even overlap. Nevertheless, it is assumed that each cell is individually identifiable, e.g., each cell can have a global cell identity.

Also in this document, 3GPP is primarily used as examples for explanation purposes. However, the scope of this disclosure is not limited to the set of 3GPP wireless network systems. The scope thereof can encompass many domains of wireless network systems.

In the background section of this document, it is noted that an alternative to the GPS-based positioning is desirable since not all UEs are equipped with the GPS or A-GPS receivers and not all wireless network may be able to provide or assist with the GPS-based positioning. Even if the UEs are so equipped and the wireless network can provide such assistance, the performance in indoor and/or in urban environments may be non-satisfactory. Some solutions have been proposed, but the existing solutions have many disadvantages.

To address some or all problems and difficulties associated with the existing solutions, in a non-limiting aspect, the PRS transmissions are enabled at different time intervals in different cells, and the intervals are set to be different, preferably at least as large, from those used for positioning low-interference subframes in the same cell.

In a non-limiting aspect, the PRS transmission intervals can be decided locally in the base stations such as eNodeBs in LTE, in a distributed manner involving communication between the base stations. That is, the muting patterns for a cell can be determined by a base station corresponding to the cell. The base station can communicate the muting pattern of the cell to other network nodes including to a positioning node and/or to other base stations corresponding to other cells.

In another non-limiting aspect, the muting pattern of a cell may be determined by a network node not corresponding to the cell. That is to say, the cell's muting pattern need not be determined by the base station corresponding to the cell. The network node can be other base stations or a positioning node.

The network node can communicate the muting pattern of the cell to other network nodes. An example of a positioning node is an E-SMLC or SLP in LTE.

Of course, a combination is also possible in that some base stations can locally decide the muting pattern of their corresponding cells while for other cells, their muting patterns may be determined by network nodes not corresponding to the cells.

Also an enhancement to the assistance information format is proposed so that necessary information can be communicated to the UE. If the muting pattern is to be decided by the positioning node such as E-SMLC or SLP, the information could be communicated to devices being positioned e.g. UEs via the LTE positioning protocol (LPP) in the control plane in 3GPP. When the muting pattern(s) are determined by the base station, the information can either be communicated to the UEs directly or to the positioning node, again using the LPP protocol for example. It is also contemplated that some other protocol and/or proprietary interface could also utilize the proposed signaling and the assistance format, e.g., for communicating the information between a network node and UE, either in the control plane or in the user plane.

The following non-limiting inventive aspects can be implemented together or independently:
  Design of PRS transmission and muting patterns,
  Pattern signaling and mapping, and
  Cell group design to assign PRS transmission and muting patterns by the cells.

PRS Transmission and Muting Patterns

In one or more existing solutions, the muting pattern has been applied at the subframe level. For a muting pattern length of M in the existing solution in which a cell transmits its PRS in one of M subframes, the fraction of 1/M of all the eNodeBs will be assigned the same muting pattern as the serving cell. Since signals from these cells will be much weaker, the UE will not be able to measure the PRS transmitted by these cells. M can be 6 at most in the existing solutions.

However, inventors of the present subject matter have recognized a cell need not transmit its PRS in every positioning occasion. When a positioning occasion occurs, a cell may transmit the PRS or may mute the transmission even though it is allowed to transmit. Thus, even if two cells are assigned identical muting pattern at the subframe level (and they both have the same PRS pattern ID), if they transmit in alternate positioning occasions, their signals will not interfere. In other words, another level of PRS orthogonality is introduced by considering muting patterns at the positioning occasion level. This solution is applicable regardless of the predetermined periodicity N of positioning occasions such as 160, 320, 640, or 1280 ms.

Note that muting does not necessarily mean that the power level of the PRS is zeroed out although that is one form of muting. The power level can be reduced, not necessarily to zero, but to a point where it is unlikely to cause interference with other signals.

In a non-limiting aspect, the muting pattern of a cell is determined, at least in part, based on its positioning parameters. The positioning parameters include a skip indicator, a transmit positioning occasion indicator, a transmit subframe indicator, and a positioning occasion periodicity indicator. The skip indicator indicates a number of consecutive muted positioning occasions that subsequently follow each transmit positioning occasion such that the transmit positioning occasions for the cell regularly repeats. The transmit positioning occasion indicator indicates which of the positioning occasions are the transmit positioning occasions for the cell. The transmit subframe indicator indicates which subframe within the transmit positioning occasion will be used to by the cell to transmit its PRS. The positioning occasion periodicity indicator indicates the predetermined periodicity N.

It should be noted that some of the indicators may not need to be determined because the related information is already known. For example, the predetermined periodicity N may of a network may be universally known or assumed. In this instance, there would be no need to determine the positioning occasion periodicity indicator.

Note that some of the indicators, even if determined, may not need to be provided as part of the assistance information to the UE. For example, the wireless network may be the home network of the UE. In this instance, it can be expected that the UE already has knowledge of some information. For example, the UE may already have information regarding the predetermined periodicity N of its home network which means the positioning occasion periodicity indicator need not be transmitted to the UE. However, if a cell of the network is serving a visiting UE, the cell may provide the positioning occasion periodicity indicator.

In one non-limiting embodiment, the muting pattern of a cell is controlled by two parameters—step factor k as the skip indicator and a shift $\Delta_{PRS}$ as the transmit position occasion indicator. The step factor k specifies a relationship $z=2^k$, in which z represents the number of consecutive muted positioning occasions that subsequently follow each transmit positioning occasion. This means that the PRS transmissions for the cell occurs every $2^k$-th positioning occasions, and is explained with reference to FIGS. 4A-4D. In these figures, each row represents a PRS transmission pattern for a cell. The positioning occasions for cells are represented as hatched boxes. The diagonal hatched boxes represent positioning occasions used by the cell for PRS transmission and cross hatched boxes represent position occasions not used by the cell for PRS transmission.

Figure 4A:
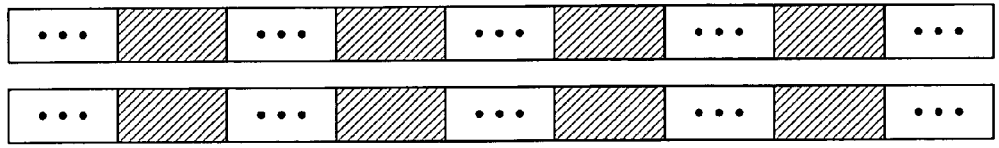
FIGS. 4A, 4B, 4C and 4D illustrate exemplary muting patterns.
Figure 4B:
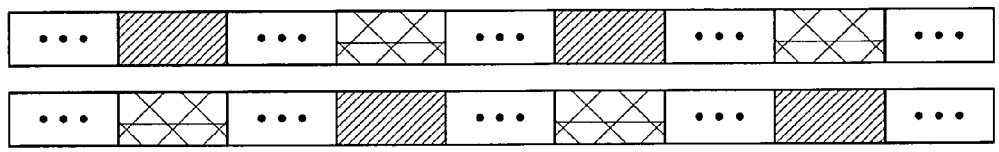
Figure 4C:
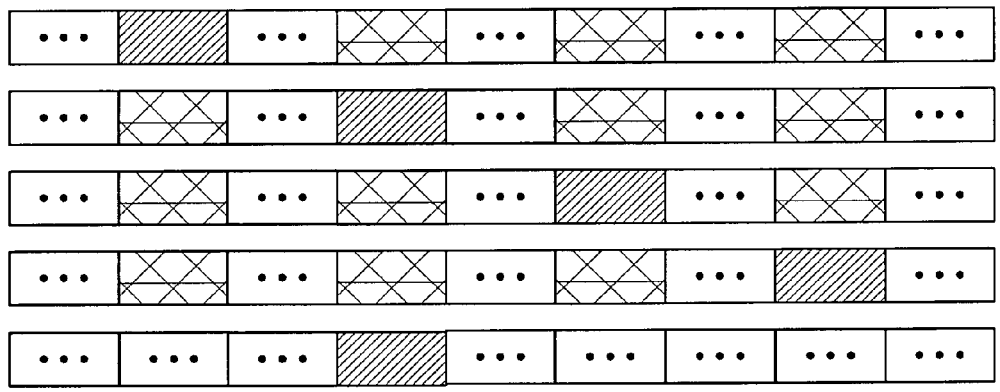

When k=0, a cell transmits every positioning occasion ($2^0=1$) as illustrated in FIG. 4A. When two cells transmit on every positioning as illustrated, a collision can occur. When k=1, a cell can transmit its PRS on every other positioning occasion ($2^1=2$). As illustrated in FIG. 4B, two cells can transmit their PRS signals without collision. As the step factor k increases, more cells can transmit their PRS signals without collision. For example, when k=2, four cells can transmit without collision ($2^2=4$) as illustrated in FIG. 4C.

It should be noted that the positioning occasion periodicity need note be the same for the cells. It is fully contemplated that the positioning occasion periodicity for at least one cell can be different from other cells. In FIG. 4C for example, the positioning occasion periodicity of PRS transmissions for four cells corresponding to top four patterns are the same, e.g. the occasions repeat every N subframes, and the k=2 for these cells. However, the bottom row in the figure can represent a beaconing device with no muting periods (k=0) but with a different, longer positioning periodicity. Using longer periodicities may be useful when it is possible to ensure that such a node (the beaconing device, in this example) does not interfere with other cell transmissions which have shorter periodicities. To ensure this is possible either by ensuring the proper scheduling behavior or utilizing the fact that the nodes transmit only a limited set of signals (e.g. PRS only) being silent during most of the time which is likely to be the case with beaconing devices.

The step factor k can be any non-negative integer. But in practice, k is unlikely to be higher than 3. Note that overall measurement time increases exponentially according to k, and thus, a big k value may mean that the overall measurement time may become too long. Thus, a big k value is undesirable for a cell that is important for positioning measurements. However, if a cell is not so important for positioning at some particular time (e.g. when there are sufficiently many pico cells around during the day, transmitting PRS from the macro cell in the same area may be less important), the step factor k may be set to be large.

Then set of feasible values of the shift $\Delta_{PRS}$ is $\{0, 1, \ldots 2^k-1\}$ such that the cell transmits its PRS positioning occasions defined by $$r \cdot 2^k + \Delta_{PRS} \qquad (1)$$

where r is a non-negative integer. For example, in FIG. 4B, the shift (or the transmit position occasion indicator) $\Delta_{PRS}=0$ for one cell and $\Delta_{PRS}=1$ for the other cell. In FIG. 4C, $\Delta_{PRS}=0, 1, 2, 3$ for each of the top four cells. The combination (k, $\Delta_{PRS}$) is sufficient when the occurrence of positioning subframes is known.

The occurrence of the positioning subframes can also be represented by a combination of the periodicity N and a transmit subframe index $\Delta$. Then, the subframe indexes in which the PRS are to be transmitted can be calculated as follows:

$$N \cdot (r \cdot 2^k + \Delta_{PRS}) + \Delta \qquad (2).$$

In one non-limiting embodiment, the positioning parameters of the cell includes the transmit subframe index $\Delta$ as the transmit subframe indicator. To reduce the data needed to specify the periodicity N, a periodicity factor n can be provided as the positioning occasion periodicity indicator. Then, the subframe indexes in which the PRS are to be transmitted can be calculated as $$a \cdot 2^n \cdot (r \cdot 2^k + \Delta_{PRS}) + \Delta \qquad (3).$$

In equation (3), a is the measuring unit of the positioning occasion periodicity, e.g., the number of subframes in a frame. As an example, a=10 when the periodicity is measured in radio frames in LTE. Then $a \cdot 2^n$ models the currently agreed positioning intervals of 160, 320, 640, and 1280 ms when a=10 and n=4, 5, 6, and 7 respectively. To further reduce the amount of data needed to specify N, a periodicity index x may be provided in which n=4+x and x=0, 1, 2, 3.

Figure 4D:
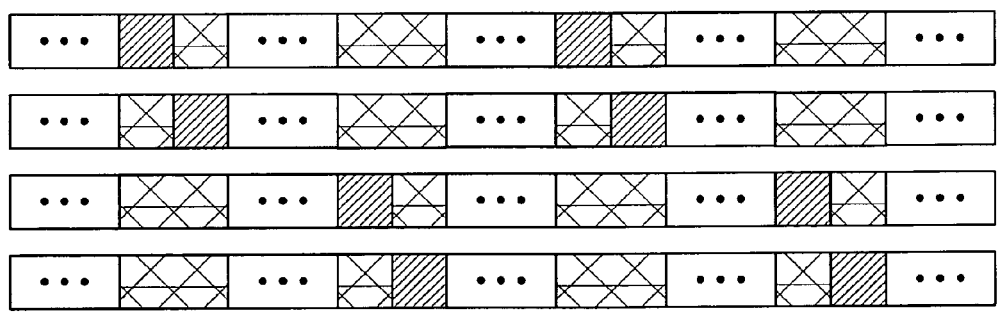

Note that in some scenarios, a positioning occasion can also be viewed as a part (e.g., a half) of the consecutive positioning subframes as seen in FIG. 4D. In this scenario, each positioning occasion is determined to be composed of $N_{PS}$ consecutive positioning subframes. The $N_{PS}$ frames are a part of the of $N_{PRS}$ consecutive subframes. Preferably, $N_{PRS}$ is evenly divisible by $N_{PS}$. That is, $N_{PRS}=b \cdot N_{PS}$, b being a positive integer. For example, FIG. 4B illustrates a scenario in which b=2. In general, when the positioning occasion is a part of the consecutive positioning subframes, b is an integer greater than 1.

Pattern Signaling and Mapping

As discussed, it is possible to fully specify the positioning occasions and PRS transmission occasions by the two pairs, (n, $\Delta$) and (k, $\Delta_{PRS}$), respectively. Preferably, this information is made known to the UE, e.g., by communicating from the positioning node to the UE. Such signaling can reduce the UE complexity and optimize the positioning performance. Note that if the smallest positioning occasion interval is known, then (x, $\Delta$) could be signaled instead of (n, $\Delta$). Some further optimization may also be possible for the shift parameter $\Delta$. For example, to minimize the number of bits to be signaled can be minimized, when the range of $\Delta$ is known similar to way in which the number of bits when the range of n is known.

In a fully asynchronous network, there may be no need in low-interference positioning subframes and thus positioning occasions may need to be known. The PRS transmissions could then be assumed for every positioning occasion. This would correspond to a special case when k=0 and $\Delta_{PRS}$=0, i.e., there may be no need to signal (k, $\Delta_{PRS}$). Then the assistance information need only include the transmit subframe indicator (e.g. $\Delta$) and the positioning occasion periodicity indicator (e.g. n).

When in a synchronous network positioning occasions coincide for all cells that are to be measured by the UE, it may be enough to communicate the positioning occasion periodicity indicator and the transmit subframe indicator (e.g. (n, $\Delta$) or (x, $\Delta$)) for the serving cell and the skip indicator and the transmit positioning occasion indicator (e.g. (k, $\Delta_{PRS}$)) for all cells, including the serving cell, when the step factor k varies by cells. If k is the same for all cells, it can be signaled only for one of the cells designated as a reference and then only $\Delta_{PRS}$ cam be signaled for each cell to be measured. Preferably, the UE's serving cell is the reference cell.

Furthermore, if there exists a one-to-one mapping between the PCI and $\Delta_{PRS}$, then there is no need to signal the $\Delta_{PRS}$. One example of such a mapping is $$\Delta_{PRS} = \text{mod}\left(\left\lfloor \frac{PCI}{6} \right\rfloor, 2^k\right). \quad (4)$$

The mapping expressed in equation (4) indicates that in general, the shift $\Delta_{PRS}$ can be determined based on the physical cell identification of the cell, a frequency reuse factor of the PRS signals of the network, and the step factor k.

In a network with distributed antenna systems, the mapping could also be based on a combination of the PCI of the cell and an antenna index that uniquely identifies the antenna location. With the same associated PCI, the distributed antennas with different antenna indexes could transmit the PRS in different positioning occasions, i.e. they can have different $\Delta_{PRS}$. Due to a large separation in time between the positioning occasions, the UE (or the positioning unit) would know the transmit antenna location based on the knowledge of PCI and $\Delta_{PRS}$.

Similarly, the indexing could be reused, for example, for beaconing devices (i.e. PCIs and the device IDs could overlap in the same area), but PRS transmission can be allocated to positioning occasions for the devices when there are no PRS transmissions from eNodeB's.

A similar approach could be applied for type II relays. For example, the relays can retransmit the PRS received from the eNodeB's in positioning occasions not utilized by eNodeB's. However, no more than one retransmission for the same PCI should occur in the same area. If retransmissions for a cell with an associated PCI are limited to at most $2^k-1$ relays, which may be indexed with respect to the PCI as rPCI= $\{1, \ldots, 2^k-1\}$, then a one-to-one mapping between rPCI and $\Delta_{PRS}$ could be designed as $$\Delta_{PRS} = \text{mod}\left(\left\lfloor \frac{PCI}{6} \right\rfloor + rPCI, 2^k\right). \quad (5)$$

In general, it is proposed that at least two parameter combinations (k, $\Delta_{PRS}$) and (n, $\Delta$) or (x, $\Delta$) be signaled. Also, in some special cases, signaling some of the four parameters can be avoided.

Cell Group Design to Assign PRS Transmission and Muting Patterns by the Cells

Implementing one-to-one mapping between the PCI and the shift $\Delta_{PRS}$ can reduce signaling overhead. But at the same time, the one-to-one mapping does not allow for controlling interference and the set of interferers. With the available signaling, however, such controlling becomes possible and could be done in the positioning node as an example. Cell grouping can also be adopted when the UE conducts measurements in a group-serialized manner, which allows keeping the UE complexity at a reasonably low level. The "group-serialized" measuring is described as follows. The UE measures several cells in parallel (group 1). Then sequentially to group 1, the UE measures in parallel for cells in group 2, and so on. In this way, groups of cells are measured, whilst cells within each group are measured in parallel.

Optimal cell grouping can be viewed as an optimization problem in which the task is to allocate time slots, i.e. positioning occasions, to the cells such that the total interference is minimized (the objective function). Furthermore, with the one-to-one mapping between the PCIs and PRS patterns, the cells can be grouped into 6 independent sets between which there is no interference. The cell grouping problem can therefore be decomposed into 6 independent subproblems. Each subproblem can be formulated as a variant of the minimum-interference channel assignment problem.

Let $c_{ij}$ be the interference cost parameter on the link between cells i and j. In one embodiment, $$c_{ij} = \max\left(\frac{P_i}{P_j}, \frac{P_j}{P_i}\right) \cdot g_{ij}, \quad (6)$$

where $P_i$ and $P_j$ represent the transmit power levels in linear scale per PRS resource element in cells i and j, respectively, and $g_{ij}$ (assuming symmetric links between two cells, i.e. $g_{ij}=g_{ji}$). In equation (6), $g_{ij}$ may be viewed as an estimated factor related to isolation between cells i and j (e.g. the highest over the area relative path gain for the two cells, which can also be scaled with an importance factor of the area). Lower $g_{ij}$ indicates better isolation and thus lower "cost" for including these two cells in the same group. Conversely, higher $g_{ij}$ indicates worse isolation and thus higher "cost" for transmitting reference signals in these two cells at the same time.

In another embodiment, the interference cost parameter can be modeled as signal-to-interference or as signal-to-interference-plus-noise estimated for the corresponding links between the two cells. Then the following set of binary variables $x_{ij}^d$, i≤j, d={0, . . . , $2^k-1$} can be defined for each subproblem, $$x_{ij}^d = \begin{cases} 1, & \text{when cells } i \text{ and } j \text{ simultaneously trasnmit} \\ & \text{PRS in positioning occasion } d, \\ 0, & \text{otherwise.} \end{cases}$$

where i=j is a special case so that $x_{ij}^d$, is one when PRS is transmitted in cell in positioning occasion d. The integer program formulation is then as follows, $$\sum_d \sum_{i<j} c_{ij} x_{ij}^d \to \min \quad (7)$$

$$\sum_d x_{ii}^d = 1, \text{ for all } i$$

$$x_{ii}^d + x_{jj}^d \leq x_{ij}^d, \text{ for all } d \text{ and all pairs } (i, j), i < j$$

Unfortunately, this is known to be NP-hard in general and thus there is no polynomial time algorithm for solving it. However, a polynomial-time approximation algorithm is proposed which would allow the problem to be tackled in practice.

Figure 5:
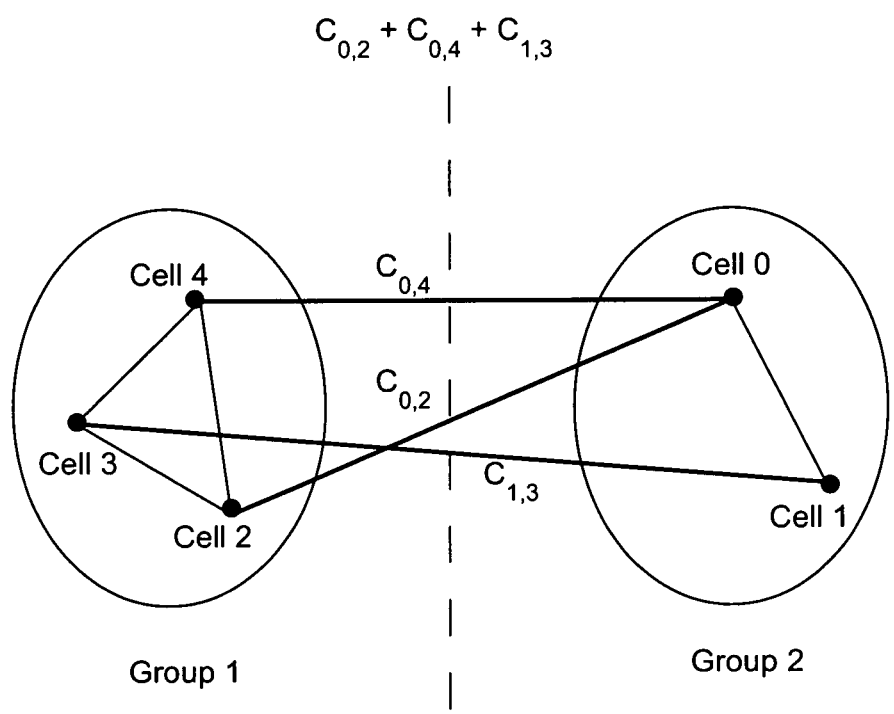
FIG. 5 illustrates an example max-cut problem/solution for grouping of cells.

The approximation approach is based on the assumption that a cell transmits the PRS once in $2^k$ positioning occasions. This assumption allows a solution to the optimization problem (7) to be found by solving $2^k-1$ weighted max-cut problems using a heuristic or a local search algorithm. In the weighted max-cut problem, the goal is to find the set of graph edges—links between two cells—which give the maximum sum of edge weights representing interference costs and thus the minimum sum of interference costs induced by the interfering cells transmitting PRS in the same positioning occasion (i.e. belonging to the same group) as illustrated FIG. 5. The set of selected edges in a solution to the max-cut problem (i.e. the edges corresponding to the x-variables having value 1) connect vertexes (cells) belonging to different groups.

As seen, the solution to the max-cut problem is a graph partition that divides the nodes (cells) into two groups. With k=1, i.e. when the PRS are transmitted every second positioning subframe, only one weighted max-cut problem is to be solved and two groups of cells are to be identified. The cells in each group will transmit the PRS in the same positioning occasions, e.g. group 1 cells can transmit in even positioning occasions and group 2 cells can transmit in odd positioning occasions.

The approximation solution approach to the cell grouping problem can be summarized as follows:

(I) Define 6 sets of cells, one for each PRS pattern ID: $\Omega^{(s)}$, s={0, . . . , 5}, is the set of cells with PRS pattern index s.

(II) For each $\Omega^{(s)}$:
  a. Define a set of interference cost parameters $c_{ij}$ ($c_{ij} \in \Omega^{(s)}$).
  b. For each q=1, . . . , k, solve $2^{q-1}$ weighted max-cut problems for the groups of cells obtained for q−1 when q>1 and for $\Omega^{(s)}$ when q=1, $2^k-1$ problems are solved in total and $2^k$ cell groups are obtained.
  c. Allocate a positioning occasion for PRS transmission to each of the cells groups such that PRS transmissions in cells from different groups do not overlap in time.

Grouping of cells described above will be further discussed later in the context of describing a method, implemented by a network node, to determine the muting patterns of cells.

Figure 6:
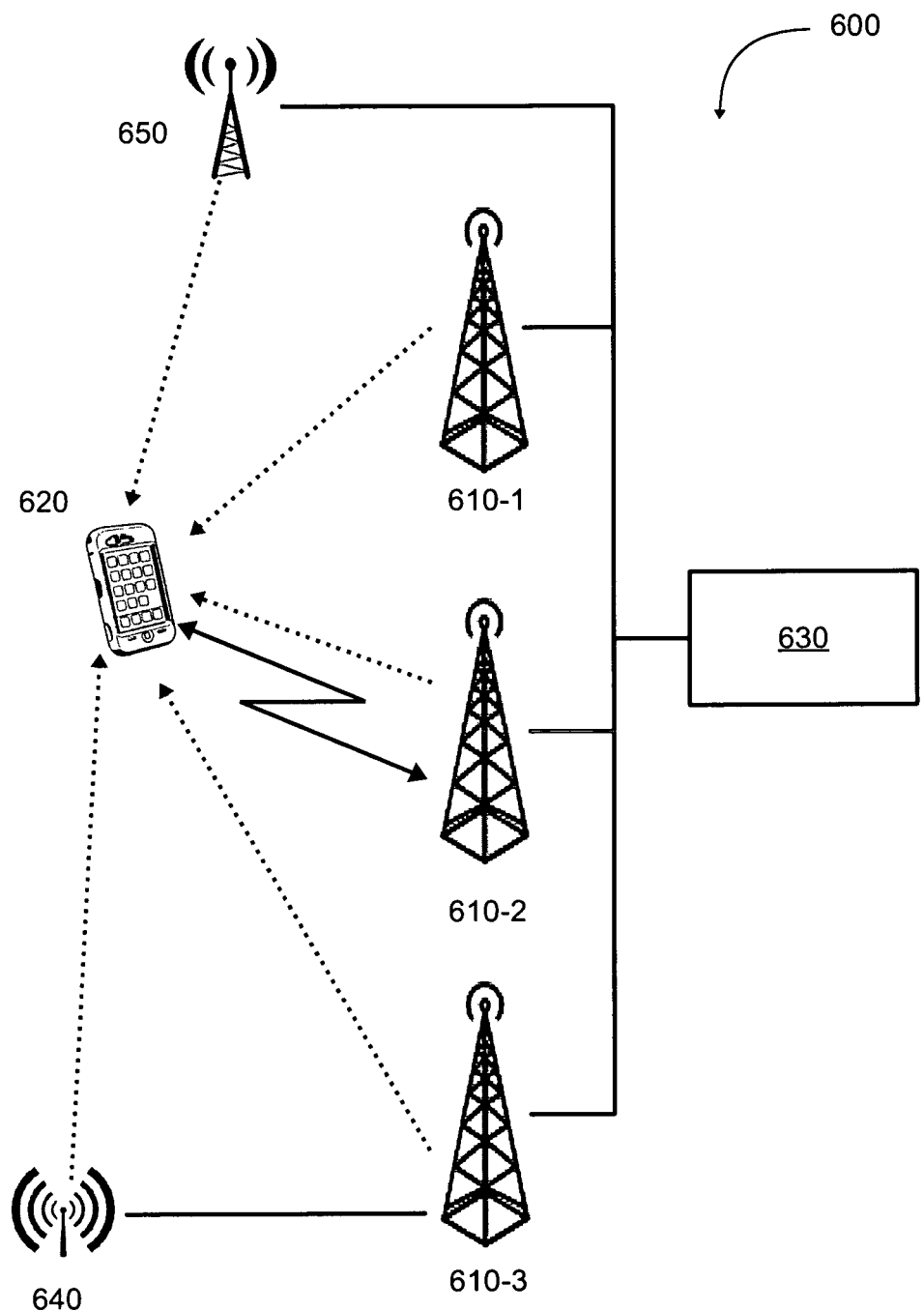
FIG. 6 illustrates an example wireless network arrangement.

FIG. 6 illustrates an example arrangement of a wireless network 600 for positioning configuration. For simplicity of explanation, a minimal number of nodes are shown. However, it is to be noted that various aspects of the disclosed subject matter are applicable in a network with many more nodes. In FIG. 6, the network 600 includes three base stations 610, e.g. eNodeBs in LTE. Each base station 610 is associated with at least one corresponding cell. Of course, any one base station may be associated with more than one cell. However, for simplicity, each base station 610 is assumed to associated with the corresponding cell 610. In this context, base stations and cells are used synonymously.

FIG. 6 can be described as illustrating three cells 610-1, 610-2 and 610-3 served by corresponding base stations. In the figure, the cells 610 are assumed to be neighbors of each other. Some or all base stations corresponding to the cells may transmit PRS signals according to a muting pattern particular to that cell, and the muting patterns are "heard" by the UE 620. In the figure, the middle cell 610-2 is illustrated to be the serving cell for the UE 620 as indicated by the bi-directional solid communication line.

The network 600 may also include a positioning node 630, such as an E-SMLC or SLP in LTE. The role that the positioning node 630 may serve will be explained in further detail below.

In addition, a cell may also be associated with a relay device 640, which in FIG. 6 is illustrated to be connected to the base station 610-3. In this configuration, the relay device 640 relays signals from the base station 610-3 extending the service range of the base station 610-3. The relay device 640 can transmit PRS signals of its own.

The network 500 may further include a beaconing device 650 that can transmit PRS signals. To the extent that the beaconing device 650 transmits its PRS signals over a "coverage area", the term "cell" will also be used to indicate that there is a coverage area, i.e. a cell, that correspond to the beaconing device. Note that the cell corresponding to the beaconing device may overlap with cell or cells of the base stations 610 and/or of the relay device 640. In another words, the beaconing device 650 may in the same area.

To enable the UE's location to be determined, the base stations 610, as well as the relay device 640 and the beaconing device 650, may perform PRS transmissions which can be heard and measured by the UE 620. The PRS transmissions are represented as dashed arrows to the UE 620. In FIG. 6, it seen that the PRS signals may be transmitted by all of the base stations 610, the relay device 640, and the beaconing device 650.

When the muting patterns of the cells (610-1, 610-2, 610-3, 640, 650) are all different, the PRS transmission interferences is eliminated. In one aspect, the muting patterns for the cells may be determined locally. That is, the base station 610 may determine the muting pattern for at least one of the cells corresponding to the base station 610. The relay device 640 and/or the beaconing device 650 may determine its own corresponding muting pattern also. The locally determined muting pattern may then be communicated to another node in the network. For example, the base station 610, the relay device 640, and/or the beaconing device 650 can communicate its muting pattern to the positioning node 630, e.g. over a LPP protocol. The positioning node 630 may centrally keep the muting pattern information for some or all cells in the network. As will be shown in detail further below, assistance information may be provided from the positioning node 630 to the UE 620, for example via LPP protocol, with the radio link portion of the communication being provided through the serving cell 610-2.

It is possible for a base station to communicate its corresponding cell's muting pattern to another base station. This of course implies that at least one base station can receive muting patterns of non-corresponding cells. However, the muting patterns themselves are cell-specific. Also, just as the positioning node 630 may maintain muting patterns for multiple cells, the base stations 610 may also maintain muting patterns for multiple cells. The relay device 640 may communicate its corresponding cell's muting pattern to its connected base station.

In another aspect, the muting patterns for cells may be determined centrally and then distributed. For example, the positioning node 630 may determine the muting patterns for some or all cells 610, 640 and/or 650. When needed, the positioning node 630 may provide assistance information to the UE 620 via the serving cell 610-2. Of course, it is possible for a base station to determine muting patterns, not only for its corresponding cell, but for other cells as well.

Of course, both distributed and local determination of muting patterns are contemplated. Some or all network nodes, e.g. base stations, relay devices, beaconing devices may determine muting patterns for own cells and communicate the information to other network nodes such as other base stations or positioning nodes. Also some or all network nodes, e.g. base stations or positioning nodes, may determine the muting patterns for other cells and communicate the information to other network nodes. Some or all network nodes may provide assistance information to the UEs.

Figure 7:
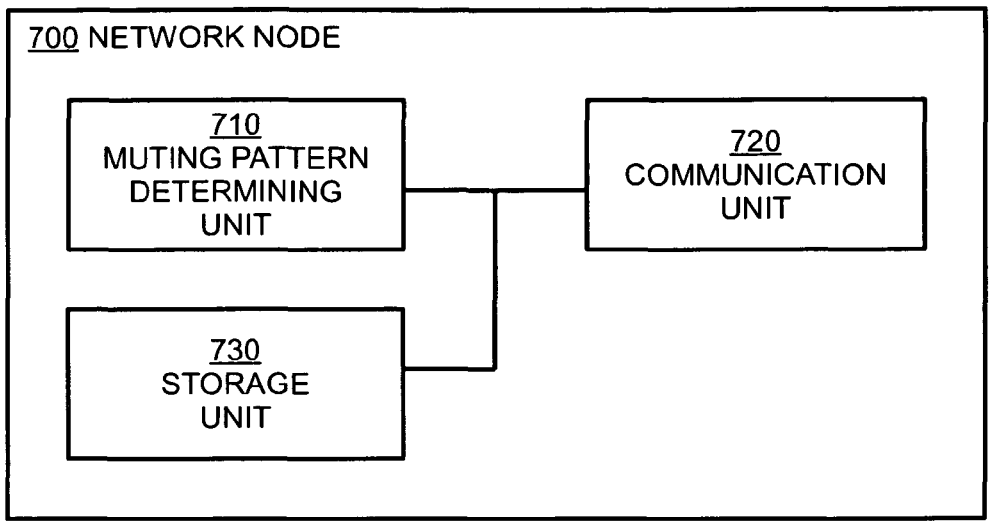
FIG. 7 illustrates an example arrangement of a network node.

FIG. 7 illustrates an example arrangement of a network node 700. The network node may be relay device, a beaconing device, or a base station such as an eNodeB in LTE. The network node may also be a positioning node such as an E-SMLC or SLP in LTE. As seen, the network node 700 may include a muting pattern determining unit 710, a communication unit 720 and a storage unit 730.

Figure 8:
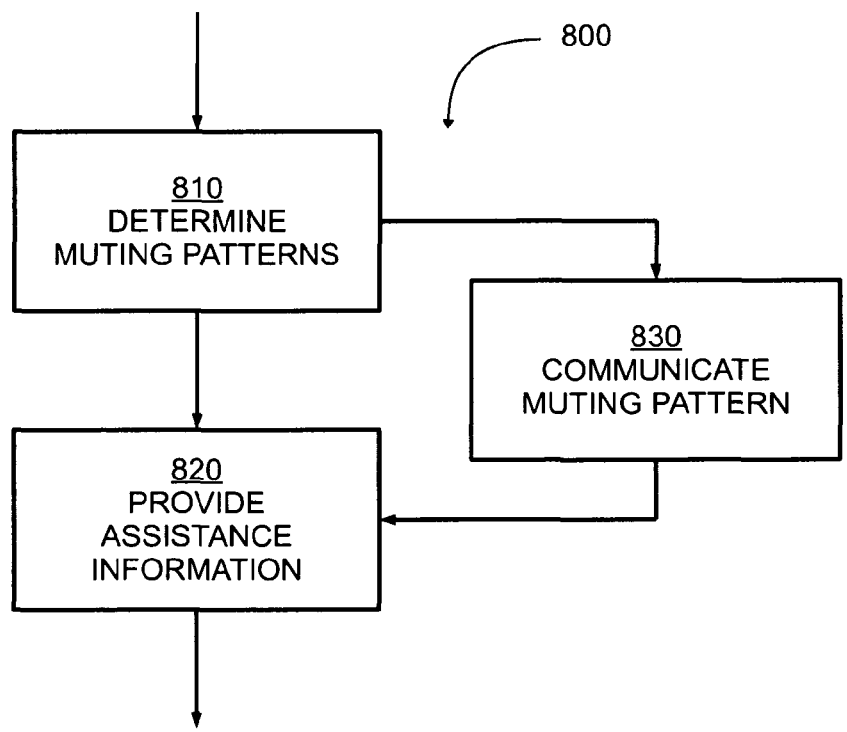
FIG. 8 illustrates an example method for defining a positioning configuration of a wireless network.

Note that FIG. 7 provides a logical view of the network node 700 and the units included therein. That is to say, it is not strictly necessary that each unit be implemented as physically separate modules. Some or all units may be combined in a physical module. For example, the muting pattern determining unit 710 and the storage module 730 may be combined in a single module. Moreover, the units need not be implemented strictly in hardware. It is envisioned that the units can be implemented through a combination of hardware and software. For example, the network node 700 may include one or more central processing units executing program instructions stored in a non-transitory storage medium or in firmware to perform the functions of the units illustrated in FIG. 7. The roles performed by the network node units will be described in conjunction with FIG. 8 which illustrates an example method for defining a positioning configuration of a wireless network.

Figure 3:
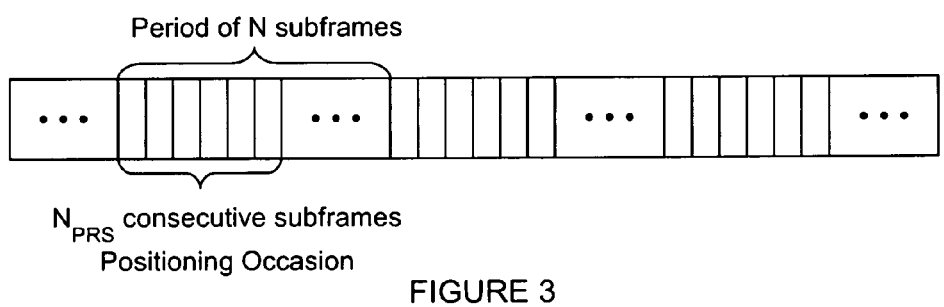
FIG. 3 illustrates a grouping of $N_{PRS}$ consecutive subframes defining a positioning occasion for PRS transmission with a periodicity of N subframes.

In method 800, it is assumed that some or all cells are capable of wirelessly transmitting their PRS signals during positioning occasions. The PRS signals are usable to determine a location of a UE also referred to as a mobile terminal. Each positioning occasion is composed of a predetermined number $N_{PRS}$ consecutive subframes having a predetermined periodicity of N subframes, $N > N_{PRS}$, such that the $N_{PRS}$ positioning subframes repeat every N subframes. See FIG. 3. Both N and $N_{PRS}$ are integers greater than zero.

In step 810, a first network node using its muting pattern determining unit 710 may determine muting patterns of one or more cells of the wireless network. In step 820, a second network node using its communication unit 720 may provide assistance information to a UE 620 being served by a serving cell. The assistance information main include the muting pattern of at least one cell determined by the first network node.

The muting pattern of a cell indicates a plurality of positioning occasions in which the cell will transmit its PRS and a plurality of positioning occasions in which the cell will mute its transmission of the PRS. For at least one cell, a number of muted positioning occasions is greater than zero. That is, there is at least one cell will mute its PRS transmission on at least some positioning occasions. On the other hand, the number of transmit positioning occasions can be zero or greater. When it is zero, the cell is always be muted. For example, when base stations are densely located, a subset of the base stations may be sufficient. But in most instance, the number of transmit positioning occasions for a cell will be greater than zero. That is, there can be at least one cell that will perform PRS transmissions during some positioning occasions and will mute its PRS transmission on other positioning occasions.

The assistance information the second network node provides is related to the muting pattern of at least one cell determined by the first network node. The first network node may be a base station 610 or a positioning node 630. The second network node may also be a base station 610 or a positioning node 630.

Note that the first and the second node may be the same node. For example, a base station corresponding to a cell may determine the cell's muting pattern and provide assistance information to the UE 620. As another example, a positioning node 630 may determine a muting pattern for a cell 610 and provide the muting pattern information of the cell to the UE. As a further example, a base station may determine a muting pattern for another cell (e.g. corresponding to another base station or a relay device) and provide the assistance information to the UE 620.

Of course, the first and second network nodes can be different nodes. When they are different nodes, the first network node communicates the muting pattern or patterns it has determined to the second network node in step 830. The first network node can be a beaconing device 650, a relay device 640, or a base station 610 and the second network node can be the positioning node 630 or another base station 610. The second network node such as the positioning node 630 stores the muting pattern of the cell and provides assistance information to the UE 620 when required. On the other hand, the first network node can be the positioning node 630 and the second network node can be the base station 610, the relay device 640 or the beaconing device 650. The second network node may perform its PRS transmissions according to the muting pattern provided by the positioning node 630.

When the muting pattern determining unit 710 determines the cell's muting pattern in step 810, one or more positioning parameters of the cell are determined. A non-exhaustive list of the positioning parameters includes the skip indicator and the transmit positioning occasion indicator. As described above, the skip indicator, e.g. the step factor k, indicates a number of consecutive muted positioning occasions that subsequently follow each transmit positioning occasion such that the transmit positioning occasions for the cell regularly repeats.

The transmit positioning occasion indicator, e.g. the shift $\Delta_{PRS}$, indicates which of the positioning occasions are the transmit positioning occasions for the cell. Recall that in one non-limiting aspect, the shift $\Delta_{PRS}$ can be determined based on the PCI of the cell, the PRS frequency reuse factor, and the step factor k. Also recall that when a cell has multiple antennas, the shift $\Delta_{PRS}$ can also be determined based on the antenna index. When the cell is associated with a relay device 640 relaying signals to and from a base station 610, the shift $\Delta_{PRS}$ for the cell is set such that the transmit positioning occasion of the relay device 640 does not overlap with the transmit positioning occasion of the base station 610.

The positioning parameters of the cell may further include the transmit subframe indicator, e.g. transmit subframe index d, that indicates which subframe within the transmit positioning occasion will be used to by the cell to transmit its PRS, and include the positioning occasion periodicity indicator, e.g. the periodicity factor n or the periodicity index x, that indicates the predetermined periodicity N.

When the communication unit 720 provides UE 620 with assistance information of one or more cells for which the muting pattern has been determined, the assistance information can include, for each cell, any one or more of the skip indicator, the transmit positioning occasion indicator, the transmit subframe indicator, and the positioning occasion periodicity indicator. Preferably, the assistance information provided to the UE 620 includes the muting patterns of the serving cell and one or more cells neighboring the serving cell.

Note that when network is an asynchronous network, the assistance information particularly includes the transmit subframe indicator and the positioning occasion periodicity indicator of the cells.

When the network is a synchronous network, and when the transmit positioning occasions coincide for all cells to be measured by the UE 620, the amount of assistance information provided to the UE can be minimized. Under this circumstance, the transmit subframe indicator and the positioning occasion periodicity indicator need only be provided for a reference cell, such as the serving cell. The skip indicators and the transmit positioning occasion indicators for all cells to be measured should be provided however.

Figure 9:
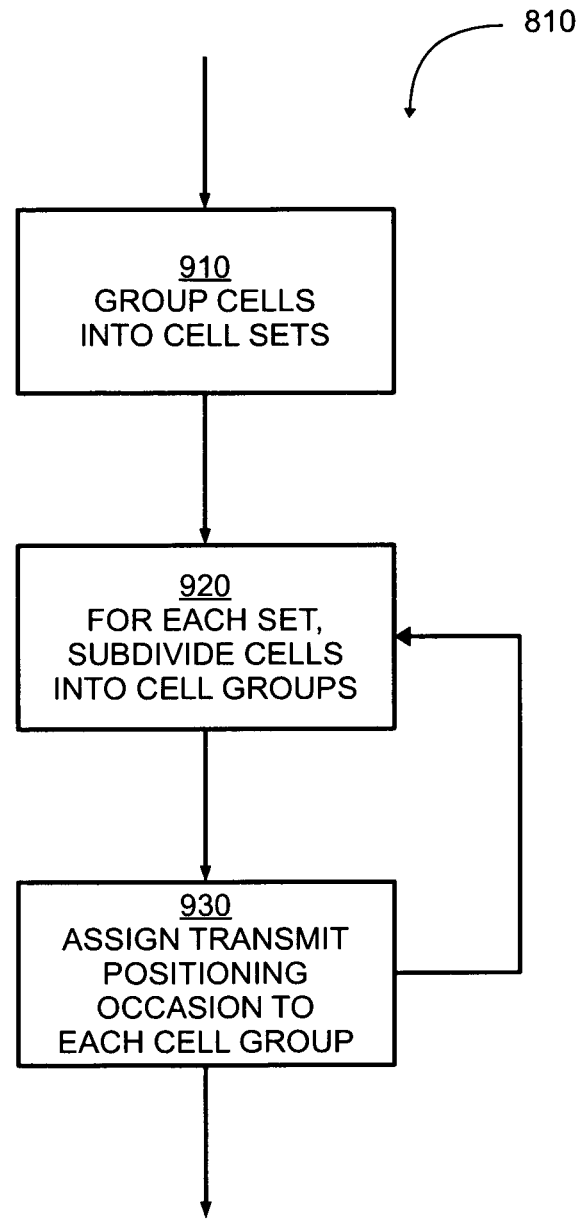
FIG. 9 illustrates a flow chart of an example process for optimizing cell groups for determining muting patterns.

Recall that when determining muting patterns for cells in the network such as in step 810 of method 800, the cells can be grouped such that total interference is minimized. FIG. 9 illustrates a flow chart of a non-limiting process to implement step 810. Some or all of the steps may be performed by the muting pattern determining unit 710 of the network node—e.g. the base station 610 or the positioning node 630.

In step 910, the cells of the network can be grouped into a plurality of cells. This can be viewed as a generalization of part (I) of the approximation solution approach discussed above. In step 910, each cell set comprises one or more cells with the same PRS pattern $\Omega(s)$ in which s is a PRS pattern ID.

Figure 10:
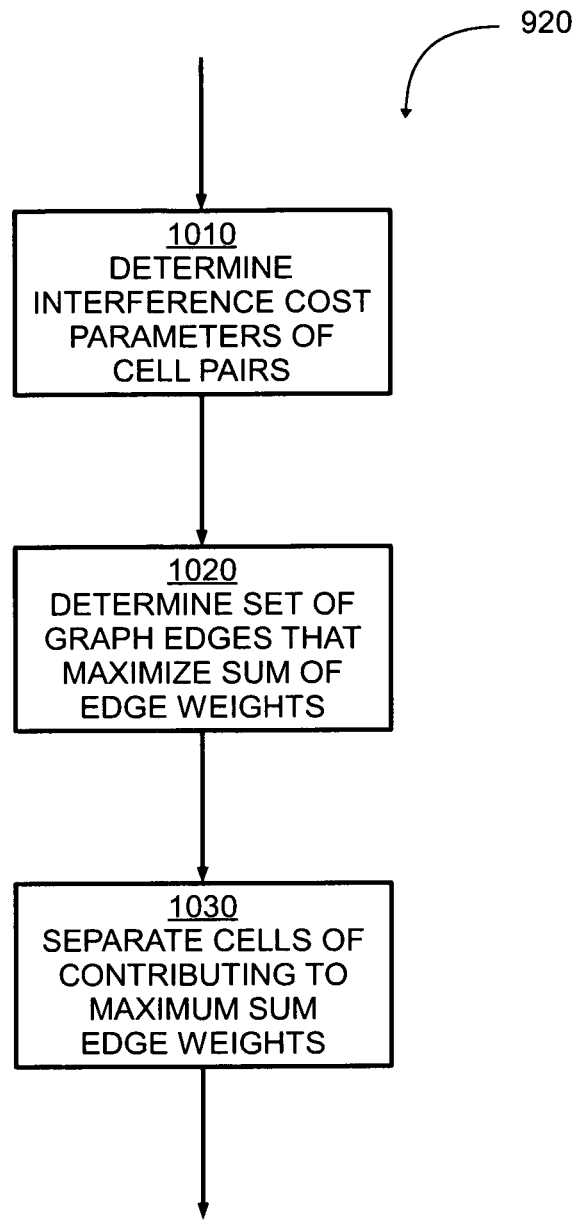
FIG. 10 illustrates a flow chart of an example process for solving max-cut problem in grouping the cells.

For each cell set, steps 920 and 930 are performed. In step 920, the cells in the set are further subdivided into a plurality of cell groups. FIG. 10 illustrates a flow chart of a non-limiting process to implement step 920. In step 1010, set of interference cost parameters $c_{ij}$ ($c_{ij} \in \Omega^{(s)}$) for a plurality of cell pairs i and j in the cell set are determined. The interference cost parameter $c_{ij}$ between cells i and j are determined can be based on any combination of PRS transmit power levels of the cells, signal-to-interference ratio of the link between the two cells, and signal-to-interference-plus-noise ratio of the link between the two cells. The cost parameter may be determined by the base station 610 corresponding to either cell i or cell j, and the cost parameter may be exchanged with other base station.

In step 1020, a set of graph edges that give a maximum sum of edge weights is determined. Each graph edge describes the isolation between two cells in the set and the edge weights representing interference costs based on the interference cost parameters. Then in step 1030, the cells in the set are partitioned into the cell groups so as to separate cells of edges contributing to the maximum sum of edge weights into different cell groups. Steps 1010, 1020 and 1030 may be viewed as generalization of parts (II.a) and (II.b) of the approximation solution approach.

Then in step 930, the transmit positioning occasions to each of the cell groups such that transmit positioning occasions of cells in different groups do not overlap in time. See also part (II.c).

Figure 11:
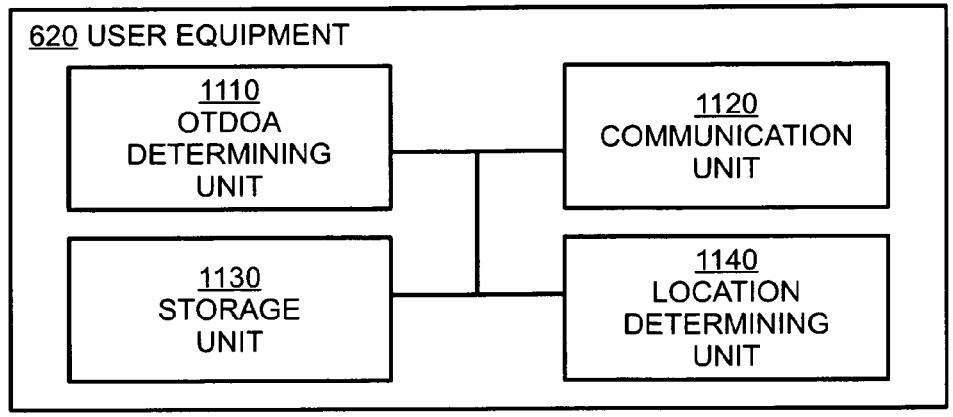
FIG. 11 illustrates an example arrangement of a user equipment.

Once the UE 620 is provided with the assistance information, the UE may make measurements so that its location can be determined. FIG. 11 illustrates an example arrangement of the UE 620. As seen, the UE 620 may include an observed timed difference of arrival (OTDOA) determining unit 1110, a communication unit 1120, and a storage unit 1130. The UE 620 may further include a location determining unit 1140. Similar to FIG. 7, FIG. 11 also provides a logical view of the UE 620, and thus, some or all units may be separate or may be combined physically. Also, the some or all units may be implemented through a combination of hardware and software. The UE 620 may include one or more central processing units executing program instructions stored in a non-transitory storage medium or in firmware to perform the functions of the units.

Figure 12:
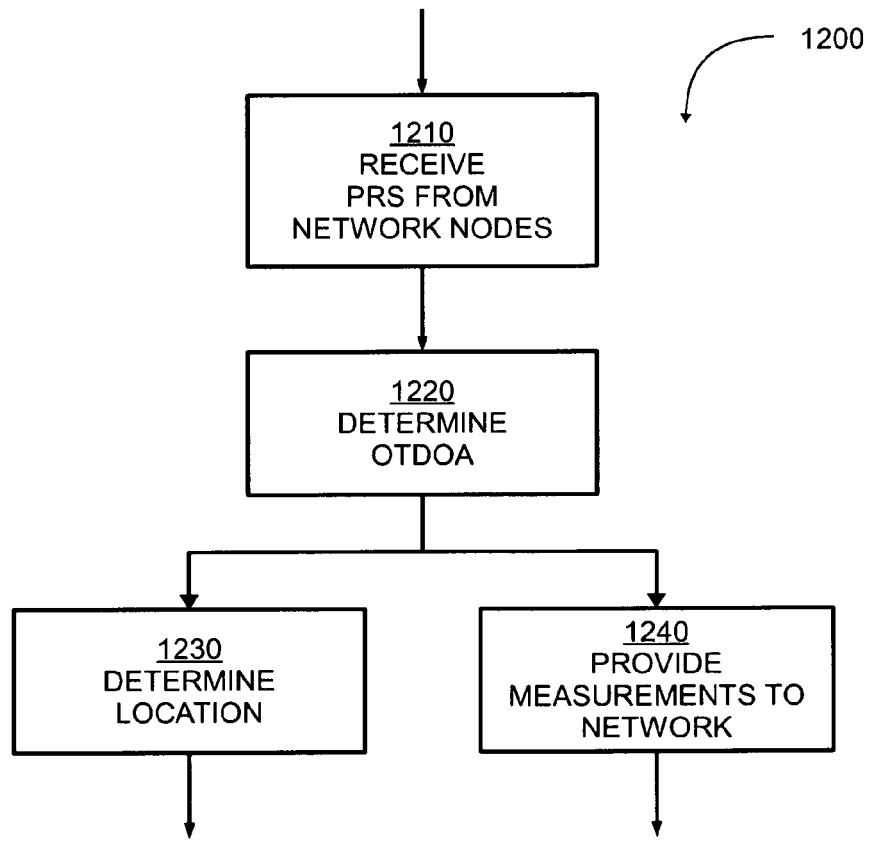
FIG. 12 illustrates an example method performed by the user equipment in determining its location.

The roles performed by the UE units will be described in conjunction with FIG. 12 which illustrates an example method 1200 for determining the location of the UE 620. In the method 1200, it is assumed that the UE 620 has received the assistance information from the network, e.g. from the positioning node 630. Recall that the assistance information includes muting patterns of the cells. Also recall that the muting pattern for at least one cell, the number of muted positioning occasions is greater than zero. Also, the number of transmit positioning occasions of the cell can be zero or greater.

In step 1210, the communication unit 1120 receives the PRS from a plurality of network nodes corresponding to a plurality of cells. Each network node may correspond to any of the cells associated with the base stations 610, the relay device 640, or the beaconing device 650. Recall that at least three measurements from geographically dispersed nodes with good enough geometry are needed to solve for the two coordinates of the UE and the receiver clock bias. If three coordinates (e.g. altitude) need to be solved, then at least four measurements are necessary. If two nodes are not sufficiently dispersed, then the PRS transmission from the second of the two nodes may not add any more information. In step 1210, it is assumed that sufficient measurements have taken place.

In step 1220, the OTDOA determining unit 1110 determines the OTDOA of the PRS transmissions from the network nodes based on the muting patterns of the corresponding cells. Note that since the muting pattern of a cell includes sufficient information to determine when the corresponding node transmits the PRS, the OTDOA determining unit 1110 can determine the amount of time each PRS signal took to arrive to the UE 620 from the network node. From this, the OTDOA of the measured PRS transmissions can be determined. Based on the OTDOA information, the location determining unit 1140 may determine the location of the UE 620 in step 1230.

Note that if the UE 620 lacks the location determining unit 1140, then alternatively in step 1240, the communication unit 1120 may provide the OTDOA information to the network, such as to the base station 610 or to the positioning node 630, so that the network may determine the UE's location. Of course, even if the UE 620 includes the location determining unit 1140, the communication unit 1120 may still provide the measurement information to the network in step 1240.

The disclosed technology provides many advantages, of which the following is a non-exhaustive list:

- A flexible way is provided to configure the positioning subframes and the PRS transmissions which allows for interference coordination for PRS;
- Possibility to reuse the PCIs is provided, for example, for inter-frequency measurements or for secondary devices such as relay type II or beaconing devices, while letting them to transmit PRS in positioning subframes not used by the eNodeBs' PRS and well-separated from them in time. For inter-frequency measurements, frequency signaling can be avoided by using cell-specific configuration in the proposed way.
- Enhanced assistance information format is provided with low overhead—a small number of bits is necessary.
- An approach is provided for constructing cell groups minimizing interference among PRS transmissions from different cells, which also allows to keep UE complexity at a low level by using group-serialized measurements.
- The positioning reference signals can be used for applications other than for positioning, e.g. for the geometry estimation or channel estimation utilizing the fact that the positioning reference signals are transmitted in low-interference subframes with a constant power over the positioning occasion and these subframes are known to the UE (unlike measuring on cell-specific reference signals, CRS, which are always transmitted but interfered by data transmissions the load of which may vary).
- The proposed solution is applicable for any reference signals in general.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method for defining positioning configuration in a wireless network, the method comprising:
   determining, by a first network node, muting patterns of one or more cells of the wireless network; and
   providing assistance information from a second network node to the UE,
   wherein some or all cells of the network are capable of wirelessly transmitting positioning reference signals (PRS) during positioning occasions, the PRS transmissions being usable to determine a location of a user equipment (UE), each positioning occasion being composed of a predetermined number $N_{PRS}$ consecutive subframes having a predetermined periodicity of N subframes, $N > N_{PRS}$, such that the $N_{PRS}$ positioning subframes repeat every N subframes, both N and $N_{PRS}$ being integers greater than zero,
   wherein the muting pattern of a cell indicates a plurality of positioning occasions in which the cell will transmit its PRS and a plurality of positioning occasions in which the cell will mute its transmission of the PRS,
   wherein a number of muted positioning occasions is greater than zero, and
   wherein the assistance information includes the muting pattern of at least one cell determined by the first network node.

2. The method of claim 1, wherein for at least one cell, the first and second network nodes are the same node.

3. The method of claim 1,
   wherein for at least one cell, the first and second network nodes are different nodes, and
   wherein the method further comprises communicating the muting pattern of the cell by the first network node to the second network node.

4. The method of claim 3, wherein the first network node is a base station.

5. The method of claim 3, wherein the second network node is a positioning node.

6. The method of claim 1,
   wherein in the step of determining the muting pattern of a cell, one or more positioning parameters of the cell are determined,
   wherein the positioning parameters include any one or more of a skip indicator, a transmit positioning occasion indicator, a transmit subframe indicator, and a positioning occasion periodicity indicator,
   wherein the skip indicator, when determined, indicates a number of consecutive muted positioning occasions that subsequently follow each transmit positioning occasion such that the transmit positioning occasions for the cell regularly repeats,
   wherein the transmit positioning occasion indicator, when determined, indicates which of the positioning occasions are the transmit positioning occasions for the cell,
   wherein the transmit subframe indicator, when determined, indicates which subframe within the transmit positioning occasion will be used by the cell to transmit its PRS, and
   wherein the positioning occasion periodicity indicator, when determined, indicates the predetermined periodicity N.

7. The method of claim 6,
   wherein the positioning parameters for the cell includes at least a step factor k as the skip indicator and a shift $\Delta_{PRS}$ as the transmit positioning occasion indicator,
   wherein k is a non-negative integer,
   wherein $\Delta_{PRS}$ is an integer between 0 and $2^k-1$, and
   wherein the transmit positioning occasions of the cell are defined by $r2^k+\Delta_{PRS}$, r being a non-negative integer.

8. The method of claim 7, wherein the shift $\Delta_{PRS}$ is determined based on a physical cell identity (PCI) of the cell, a PRS frequency reuse factor for PRS signals of the network, and the step factor k.

9. The method of claim 8, wherein the shift $\Delta_{PRS}$ is of the cell is determined also based on an antenna index which uniquely identifies a location of an antenna corresponding to the antenna index.

10. The method of claim 7,
    wherein the cell is associated with a relay device arranged to relay signals to and from a base station, and
    wherein the shift $\Delta_{PRS}$ for the cell in which the positioning reference signal from the base station is relayed by the relay device is set such that the transmit positioning occasion of the relay device does not overlap with the transmit positioning occasion of at least one cell associated with the base station.

11. The method of claim 7,
    wherein the positioning parameters for the cell further includes a transmit subframe index $\Delta$ as the transmit subframe indicator,
    wherein $\Delta$ is an integer between 0 and $N_{PRS}$, and
    wherein the subframes in which the cell transmits its PRS signal are defined by $N(r2^k+\Delta_{PRS})+\Delta$.

12. The method of claim 11,
    wherein the positioning parameters for the cell further includes a periodicity factor n as the positioning occasion periodicity indicator,
    wherein n is a non-negative integer, and
    wherein N and n are related according to $N=a2^n$, a being a number of subframes in a frame.

13. The method of claim 6,
    wherein the assistance information provided to the UE comprises assistance information of one or more cells for which the muting pattern has been determined and whose PRS transmissions are to be measured by the UE, and
    wherein the assistance information for each cell comprises any one or more of the skip indicator, the transmit positioning occasion indicator, the transmit subframe indicator, and the positioning occasion periodicity indicator.

14. The method of claim 13, wherein the cells whose PRS transmissions are to be measured by the UE include a serving cell and/or one or more cells neighboring the serving cell.

15. The method of claim 13,
    wherein the network is an asynchronous network, and
    wherein the assistance information includes the transmit subframe indicator and the positioning occasion periodicity indicator of the cells.

16. The method of claim 13,
wherein the network is a synchronous network,
wherein the transmit positioning occasions coincide for all cells to be measured by the UE, and
wherein the assistance information includes
the transmit subframe indicator and the positioning occasion periodicity indicator of a reference cell, and
the skip indicators and the transmit positioning occasion indicators of all cells.

17. The method of claim 16, wherein the reference cell is a serving cell.

18. The method of claim 1, wherein the step of determining the muting patterns comprises:
grouping a plurality of cells into a plurality of cell sets, each cell set comprising cells with same PRS pattern $\Omega(s)$, s being a PRS pattern ID; and
for each cell set $\Omega$, performing the steps of:
subdividing the cell set to a plurality of cell groups; and
assigning transmit positioning occasions to each of the cell groups such that transmit positioning occasions of cells in different groups do not overlap in time.

19. The method of claim 18, wherein the step of subdividing the cell set to the plurality of cell groups comprises:
for a plurality of cell pairs i and j in the cell set, determining a set of interference cost parameters $c_{ij}(c_{ij} \in \Omega(s))$;
determining a set of graph edges that give a maximum sum of edge weights, each graph edge describing an isolation between two cells in the cell set and the edge weights representing interference costs based on the interference cost parameters; and
partitioning the cells of the cell set into groups so as to separate cells of edges contributing to the maximum sum of edge weights into different cell groups,
wherein the interference cost parameter $c_{ij}$ between cells i and j are determined based on any combination of PRS transmit power levels of the cells, signal-to-interference ratio of the link between the two cells, and signal-to-interference-plus-noise ratio of the link between the two cells.

20. The method of claim 19, wherein the cost parameter $c_{ij}$ is determined by a base station corresponding to cell i or j, the method further comprising the corresponding base station exchanging the cost parameter information with other base stations.

21. The method of claim 20,
wherein for at least one cell, the step of determining the muting pattern comprises determining the muting pattern of the cell by the corresponding base station based on the cost parameter information exchanged with the other base station, and
wherein the method further comprises:
communicating, by the corresponding base station, the muting pattern of the cell to a positioning node; and
communicating, by the positioning node, the muting pattern of the cell to the UE via a serving cell.

22. The method of claim 1, wherein each positioning occasion is composed of $N_{PS}$ consecutive positioning subframes of $N_{PRS}$ subframes such that $N_{PRS}=bN_{PS}$, b being an integer greater than 1.

23. The method of claim 1,
wherein for at least one cell, the predetermined periodicity of the one cell is greater than the predetermined periodicity of at least one other cell, and
wherein a node corresponding to the one cell transmits its PRS at every positioning occasion.

24. The method of claim 23, wherein the node corresponding to the one cell is a beaconing device.

25. A network node for defining positioning configuration in a wireless network, the network node comprising:
a muting pattern determining unit arranged to determine muting patterns of one or more cells of the wireless network; and
a communication unit arranged to communicate the muting pattern of at least one cell to another network node,
wherein some or all cells of the network are capable of wirelessly transmitting positioning reference signals (PRS) during positioning occasions, the PRS transmissions being usable to determine a location of a user equipment (UE), each positioning occasion being composed of a predetermined number $N_{PRS}$ consecutive subframes having a predetermined periodicity of N subframes, $N > N_{PRS}$, such that the $N_{PRS}$ positioning subframes repeat every N subframes, both N and $N_{PRS}$ being integers greater than zero,
wherein the muting pattern of a cell indicates a plurality of positioning occasions in which the cell will transmit its PRS and a plurality of positioning occasions in which the cell will mute its transmission of the PRS, and
wherein a number of muted positioning occasions is greater than zero.

26. The network node of claim 25,
wherein the network node is a base station,
wherein the muting pattern determining unit determines the muting pattern of at least one cell corresponding to the base station, and
wherein the communication unit sends the muting pattern of the cell to the another network node.

27. The network node of claim 25,
wherein the muting pattern determining unit determines one or more positioning parameters of the cell,
wherein the positioning parameters include any one or more of a skip indicator, a transmit positioning occasion indicator, a transmit subframe indicator, and a positioning occasion periodicity indicator,
wherein the skip indicator, when determined, indicates a number of consecutive muted positioning occasions that subsequently follow each transmit positioning occasion such that the transmit positioning occasions for the cell regularly repeats,
wherein the transmit positioning occasion indicator, when determined, indicates which of the positioning occasions are the transmit positioning occasions for the cell,
wherein the transmit subframe indicator, when determined, indicates which subframe within the transmit positioning occasion will be used to by the cell to transmit its PRS, and
wherein the positioning occasion periodicity indicator, when determined, indicates the predetermined periodicity N.

28. The network node of claim 27,
wherein the positioning parameters for the cell includes at least a step factor k as the skip indicator and a shift $\Delta_{PRS}$ as the transmit positioning occasion indicator,
wherein k is a non-negative integer,
wherein $\Delta_{PRS}$ is an integer between 0 and $2^k-1$, and
wherein the transmit positioning occasions of the cell are defined by $r2^k+\Delta_{PRS}$, r being a non-negative integer.

29. The network node of claim 28, wherein the muting pattern determining unit determines the shift $\Delta_{PRS}$ based on a physical cell identity (PCI) of the cell, a PRS frequency reuse factor for PRS signals of the network, and the step factor k.

30. The network node of claim 29, wherein the muting pattern determining unit determines the shift $\Delta_{PRS}$ of the cell also based on an antenna index which uniquely identifies a location of an antenna corresponding to the antenna index.

31. The network node of claim 28,
wherein the cell is associated with a relay device arranged to relay signals to and from a base station, and
wherein the shift $\Delta_{PRS}$ for the cell in which the positioning reference signal from the base station is relayed by the relay device is set such that the transmit positioning occasion of the relay device does not overlap with the transmit positioning occasion of at least one cell associated with the base station.

32. The network node of claim 28,
wherein the positioning parameters for the cell further includes a transmit subframe index $\Delta$ as the transmit subframe indicator,
wherein $\Delta$ is an integer between 0 and $N_{PRS}$, and
wherein the subframes in which the cell transmits its PRS signal are defined by $N(r2^k+\Delta_{PRS})+\Delta$.

33. The network node of claim 32,
wherein the positioning parameters for the cell further includes a periodicity factor n as the positioning occasion periodicity indicator,
wherein n is a non-negative integer, and
wherein N and n are related according to $N=a2^n$, a being a number of subframes in a frame.

34. The network node of claim 27,
wherein the communication unit provides assistance information to the UE,
wherein the assistance information includes the muting patterns of one or more cells for which the muting pattern have been determined and whose PRS transmissions are to be measured by the UE, and
wherein the assistance information for each cell comprises any one or more of the skip indicator, the transmit positioning occasion indicator, the transmit subframe indicator, and the positioning occasion periodicity indicator.

35. The network node of claim 34, wherein the communication unit is arranged to receive muting patterns of one or more cells of the wireless network from at least one other network node.

36. The network node of claim 35, wherein the network node is a positioning node.

37. The network node of claim 34, wherein the cells whose PRS transmissions are to be measured by the UE include a serving cell and/or one or more cells neighboring the serving cell.

38. The network node of claim 34,
wherein the network is an asynchronous network, and
wherein the assistance information includes the transmit subframe indicator and the positioning occasion periodicity indicator of the cells.

39. The network node of claim 34,
wherein the network is a synchronous network,
wherein the transmit positioning occasions coincide for all cells to be measured by the UE, and
wherein the assistance information includes
the transmit subframe indicator and the positioning occasion periodicity indicator of a reference cell, and
the skip indicators and the transmit positioning occasion indicators of all cells.

40. The network node of claim 39, wherein the reference cell is a serving cell.

41. The network node of claim 25, wherein each positioning occasion is composed of $N_{PS}$ consecutive positioning subframes of $N_{PRS}$ subframes such that $N_{PRS}=bN_{PS}$, b being an integer greater than 1.

42. The network node of claim 25,
wherein for at least one cell, the predetermined periodicity of one cell is greater than the predetermined periodicity of at least one other cell, and
wherein a node corresponding to the one cell transmits its PRS at every positioning occasion.

43. The network node of claim 25, wherein the node corresponding to the one cell is a beaconing device.

44. A method of determining a location of a user equipment (UE) based on positioning reference signals (PRS) wirelessly transmitted from cells of a wireless network, the method comprising:
receiving, by the UE, the PRSs transmitted from a plurality of network nodes corresponding to a plurality of cells; and
determining, by the UE, an observed timed difference of arrival (OTDOA) of the PRS transmissions from the plurality of network nodes based on muting patterns of the plurality of cells, the muting patterns of the plurality of cells having been provided to the UE by the network,
wherein some or all cells of the network are capable of wirelessly transmitting the PRSs during positioning occasions, each positioning occasion being composed of a predetermined number $N_{PRS}$ consecutive subframes having a predetermined periodicity of N subframes, $N>N_{PRS}$, such that the $N_{PRS}$ positioning subframes repeat every N subframes, both N and $N_{PRS}$ being integers greater than zero,
wherein the muting pattern of a cell indicates a plurality of positioning occasions in which the cell will transmit its PRS and a plurality of positioning occasions in which the cell will mute its transmission of the PRS, and
wherein a number of muted positioning occasions of the cell is greater than zero.

45. The method of claim 44, further comprising determining, by the UE, a location of the UE based on the OTDOA information.

46. The method of claim 44, further comprising providing the OTDOA information from the UE to the network.

47. A user equipment (UE) arranged to its location based on positioning reference signals (PRS) wirelessly transmitted from cells of a wireless network, the UE comprising:
a communication unit arranged to receive the PRSs transmitted from a plurality of network nodes corresponding to a plurality of cells; and
an observed timed difference of arrival (OTDOA) determining unit arranged to determine OTDOA of the PRS transmissions from the plurality of network nodes based on muting patterns of the plurality of cells, the muting patterns of the plurality of cells having been provided to the UE by the network,
wherein some or all cells of the network are capable of wirelessly transmitting the PRSs during positioning occasions, each positioning occasion being composed of a predetermined number $N_{PRS}$ consecutive subframes having a predetermined periodicity of N subframes, $N>N_{PRS}$, such that the $N_{PRS}$ positioning subframes repeat every N subframes, both N and $N_{PRS}$ being integers greater than zero,
wherein the muting pattern of a cell indicates a plurality of positioning occasions in which the cell will transmit its PRS and a plurality of positioning occasions in which the cell will mute its transmission of the PRS, and
wherein a number of muted positioning occasions of the cell is greater than zero.

48. The UE of claim 47, further comprising a location determining unit arranged to determine a location of the UE based on the OTDOA information.

49. The UE of claim 47, wherein the communication unit is arranged to provide the OTDOA information to the network.

* * * * *

UNITED STATES PATENT AND TRADEMARK OFFICE
CERTIFICATE OF CORRECTION

PATENT NO. : 8,600,398 B2
APPLICATION NO. : 12/805809
DATED : December 3, 2013
INVENTOR(S) : Siomina et al.

It is certified that error appears in the above-identified patent and that said Letters Patent is hereby corrected as shown below:

In the Specification

In Column 9, Line 1, delete "used to by" and insert -- used by --, therefor.

In Column 9, Line 46, delete "need note" and insert -- need not --, therefor.

In Column 12, Line 50, delete "$x_{ij}^d$," and insert -- $x_{ii}^d$ --, therefor.

In Column 14, Line 4, delete "network 500" and insert -- network 600 --, therefor.

In Column 16, Line 45, delete "d," and insert -- Δ, --, therefor.

In Column 16, Line 46, delete "used to by" and insert -- used by --, therefor.

In Column 17, Line 17, delete "Ω(s)" and insert -- $\Omega^{(s)}$ --, therefor.

In Column 18, Line 42, delete "PRS;" and insert -- PRS. --, therefor.

In the Claims

In Column 20, Line 23, in Claim 9, delete "$\Delta_{PRS}$ is" and insert -- $\Delta_{PRS}$ --, therefor.

In Column 21, Line 15, in Claim 18, delete "Ω(s)," and insert -- $\Omega^{(s)}$, --, therefor.

In Column 21, Line 25, in Claim 19, delete "$c_{ij}(c_{ij}\varepsilon\Omega(s))$;" and insert -- $c_{ij}(c_{ij}\varepsilon\Omega^{(s)})$; --, therefor.

In Column 22, Line 49, in Claim 27, delete "used to by" and insert -- used by --, therefor.

Signed and Sealed this
Fifteenth Day of July, 2014

Michelle K. Lee
*Deputy Director of the United States Patent and Trademark Office*